(12) United States Patent
Zenne

(10) Patent No.: US 8,864,364 B2
(45) Date of Patent: Oct. 21, 2014

(54) DRUM DRIVE FOR A TRUCK MIXER

(75) Inventor: Gerhard Zenne, Dürmentingen (DE)

(73) Assignee: Liebherr-Mischtechik GmbH, Bad Schussenried (DE)

( * ) Notice: Subject to any disclaimer, the term of this patent is extended or adjusted under 35 U.S.C. 154(b) by 871 days.

(21) Appl. No.: 12/700,136

(22) Filed: Feb. 4, 2010

(65) Prior Publication Data

US 2010/0226197 A1 Sep. 9, 2010

(30) Foreign Application Priority Data

Feb. 5, 2009 (DE) ............... 20 2009 001 416 U

(51) Int. Cl.
*B28C 5/42* (2006.01)
*B60P 3/16* (2006.01)

(52) U.S. Cl.
CPC .. *B28C 5/421* (2013.01); *B60P 3/16* (2013.01)
USPC ............................... 366/60; 366/44; 366/54

(58) Field of Classification Search
CPC .................................. B60P 3/16; B28C 5/421
USPC ................................. 366/44, 54, 60
See application file for complete search history.

(56) References Cited

U.S. PATENT DOCUMENTS

| | | | | |
|---|---|---|---|---|
| 1,769,806 A | * | 7/1930 | Spencer | 241/282.1 |
| 1,989,877 A | * | 2/1935 | Michels | 366/41 |
| 2,100,076 A | * | 11/1937 | Gilmore | 290/1 D |
| 3,773,304 A | * | 11/1973 | Hodgson | 366/61 |
| 5,083,870 A | * | 1/1992 | Sindelar et al. | 366/25 |
| 7,448,460 B2 | * | 11/2008 | Morrow et al. | 180/65.6 |
| 7,520,354 B2 | * | 4/2009 | Morrow et al. | 180/65.31 |
| 2003/0158638 A1 | | 8/2003 | Yakes et al. | |
| 2003/0205422 A1 | * | 11/2003 | Morrow et al. | 180/65.2 |
| 2006/0070776 A1 | * | 4/2006 | Morrow et al. | 180/65.1 |
| 2007/0099750 A1 | | 5/2007 | Hickam | |
| 2007/0155552 A1 | * | 7/2007 | De Cloe | 474/23 |
| 2007/0263478 A1 | | 11/2007 | Burch | |
| 2010/0188925 A1 | * | 7/2010 | Huber et al. | 366/30 |

FOREIGN PATENT DOCUMENTS

| | | |
|---|---|---|
| DE | 3026279 | 2/1982 |
| GB | 1349462 | 4/1974 |
| JP | 2003-226192 | 8/2003 |
| RU | 2013846 | 5/1994 |
| SU | 1634555 | 3/1991 |

* cited by examiner

*Primary Examiner* — David Sorkin
(74) *Attorney, Agent, or Firm* — Dilworth & Barrese, LLP

(57) ABSTRACT

The present invention relates to a drum drive for a truck mixer with a vehicle drive train and a mixing drum, wherein the drum drive can be driven by at least one electric motor.

10 Claims, 2 Drawing Sheets

DRUM DRIVE FOR A TRUCK MIXER

BACKGROUND OF THE INVENTION

This invention relates to a drum drive for a truck mixer with a vehicle drive train and a mixing drum.

This invention relates to a drum drive for a truck mixer according to the generic part of claim 1.

Truck mixers are mobile concrete mixers which transport ready-mixed concrete to the construction site. For this purpose, the concrete is transported in a rotating drum, in order to prevent segregation or even premature setting of the concrete.

According to the prior art, the drive of the mixing drum is effected via a hydraulic drive. The hydraulic drive usually consists of a hydraulic pump which either is flange-mounted to the vehicle drive of the truck mixer or is supplied by a separate engine, and via hydraulic lines is connected with a hydraulic motor for driving the drum. To overcome the known problems of hydraulic drives, such as for example pressure and movement oscillations caused by the elasticity of the fluid, development of heat and thereby change in the viscosity of the hydraulic fluid, leakage oil losses, it is the object of the present invention to provide an alternative drive for the mixing drum of a truck mixer.

SUMMARY OF THE INVENTION

In accordance with the invention, this object is solved by the combination of the features herein. Accordingly, there is provided a drum drive for a truck mixer with a vehicle drive train and a mixing drum, wherein the drum drive can be driven by at least one electric motor. By means of the electric motor, the mixing drum is driven in a rotating movement, wherein the rotational speed can be controlled by the speed of the electric motor. It is likewise possible to drive the mixing drum with more than one electric motor, wherein the individual electric motors are synchronized with each other in terms of their rotational speed.

Preferred aspects of the invention can be taken from the description herein.

Accordingly, the drive energy of the electric motor can be provided via an additionally mounted energy source. The energy source provides the required electric energy of the electric motor for a smooth operation of the mixing drum.

Advantageously, a generator is used as energy source. The generator converts the kinetic or mechanical energy provided at its mechanical shaft into electric energy and via electric lines supplies the electric motor of the drum drive with sufficient energy for operation of the mixing drum. As energy source, all devices are conveivable, however, which alone or in combination can provide enough electric energy for operation of the mixing drum.

In a furthermore advantageous way, the generator can be driven via a separate engine. The drive shaft of the separate engine is flange-mounted to the mechanical shaft of the generator. Due to the rotational movement of the drive shaft of the separate engine, electric energy is now generated in the generator, which is passed on to the electric motor of the drum drive. The separate engine is arranged on the upper surface of the truck mixer traveling gear between operator cabin and mixing drum.

Preferably, a Diesel engine is employed as separate engine.

Furthermore, an articulated shaft can be arranged between separate engine and generator. Due to the use of an articulated shaft, the axes of rotation of generator shaft and separate engine shaft need not be in alignment with each other. There can also be effected a torque transmission from the separate engine shaft to the generator shaft, if the generator requires a torque directed opposite to the separate engine.

In accordance with another advantageous aspect of the invention, the generator can be driven via the vehicle drive train. The mechanical movement of the generator shaft for generating electric energy is provided by the drive train of the mixer truck. Usually, the generator of the mixer drive is flange-mounted to the auxiliary drive of the truck engine, usually an internal combustion engine.

Advantageously, the generator is arranged between vehicle engine and truck transmission of the vehicle drive train.

In a furthermore advantageous way, a controller is arranged between the energy source and the electric motor. The controller serves for electrically controlling the speed of the electric motor and hence the rotating or mixing capacity of the mixing drum. Accordingly, the operator can control the rotary movement of the mixer drum of the truck mixer by a mechanical lever operation or by electric operation of the controller. The control panel for controlling the electric motor can be arranged inside the operator cabin and allows the operator to conveniently control the drum speed. Furthermore, a further control panel can, however, also be mounted on the outside of the vehicle. An automated speed control of the mixing drum likewise is conceivable.

Preferably, the electric motor is connected with the mixing drum via a mixer transmission. The mixer transmission used serves to convert the speed or to convert the torque of the electric motor during transmission to the mixing drum.

BRIEF DESCRIPTION OF THE DRAWINGS

Further features, details and advantages of the invention will be explained in detail with reference to drawings and embodiments. In the drawings.

DESCRIPTION OF THE PREFERRED EMBODIMENTS

Figure 1:
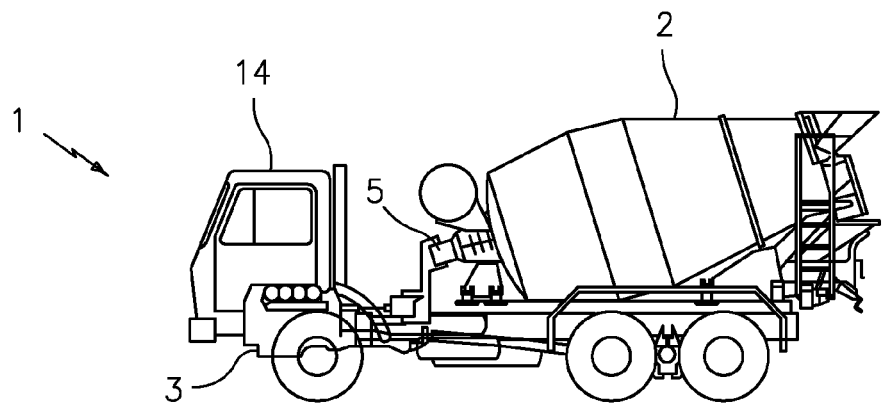
FIG. 1: shows a truck mixer according to the prior art.

FIG. 1 shows a commonly used truck mixer 1 with a drum drive according to the prior art, which beside the illustrated drive train 3, which comprises a traction motor 12, includes a hydraulically driven mixing drum 2. In a manner known per se, the mixing drum 2 is driven via a hydraulic drum drive. The hydraulic pump of this hydraulic drum drive is flange-mounted to the auxiliary drive of the vehicle drive train 3 driving the truck mixer, Via a hydraulic circuit, the hydraulic pump furthermore is connected with a hydraulic motor 5, which transmits its kinetic energy to the mixing drum 2 and thus puts the same into a rotary movement.

Figure 2:
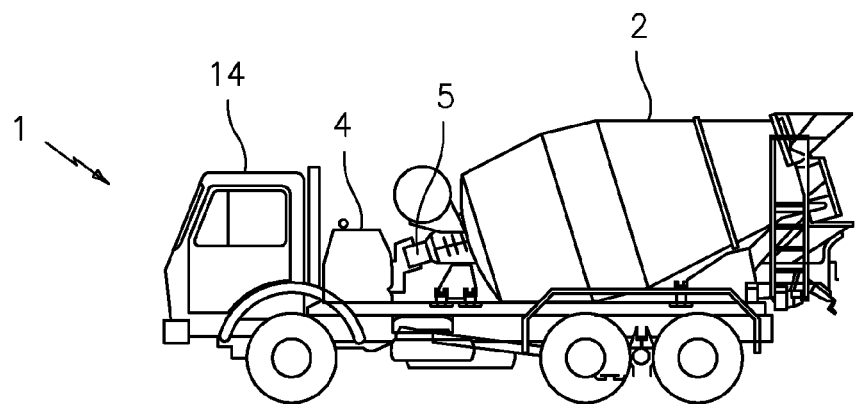
FIG. 2: shows a truck mixer according to the prior art with a separate engine.

FIG. 2 shows an alternative embodiment of a mixing drum drive according to the prior art. The hydraulic pump is not fed here via the vehicle drive, but is driven via a separate engine 4 mounted between operator cabin 14 and mixing drum 2.

Figure 3:
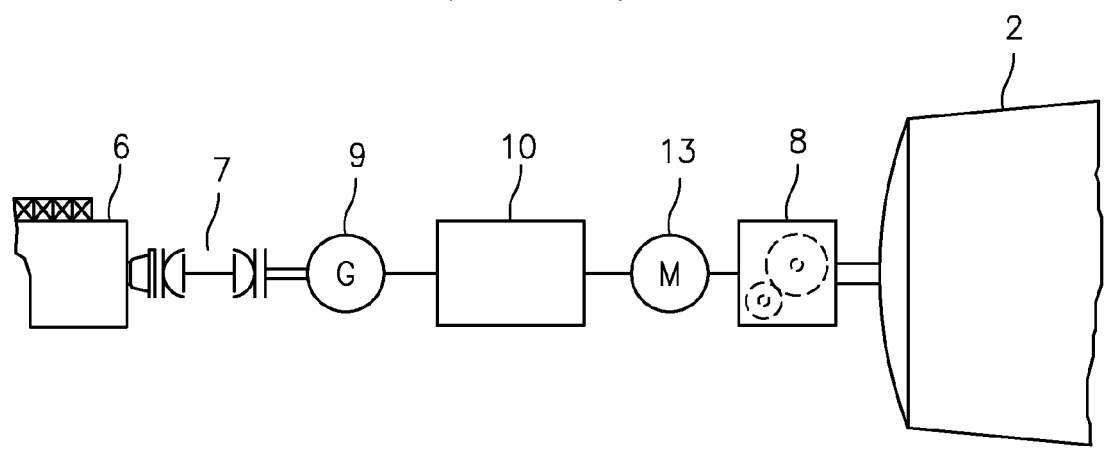
FIG. 3: shows a schematic diagram of a drum drive of the invention with a separate engine.

In FIG. 3, a first variant of the invention is shown in a schematic diagram. In the drum drive of the invention, a generator 9 is provided, which at its mechanical shaft converts the mechanical work done into electric energy. The work is performed by a drive 6 coupled via an articulated shaft 7. In the illustrated variant, the drive 6 is based on a separate engine, which can be arranged for example between operator cabin 14 and mixing drum 2 on the chassis of the truck mixer 1. The separate engine frequently is designed as Diesel unit, which can be operated independent of the vehicle engine of the truck mixer 1.

The variant according to the schematic diagram of FIG. 3 likewise shows an electric motor 13, which is fed with electric energy by said generator 9. Between generator 9 and electric motor 13 a controller 10 can be arranged, which controls the supply of electric energy from the generator 9 and hence controls the required speed of the electric motor 13 for operating the mixing drum 2. The controller 10 can be actuated by the operator via a control panel, wherein the control panel is mounted either inside the operator cabin 14 or on the outside of the vehicle. For transmitting the speed of the electric motor 13 to the drive shaft of the mixing drum 2, a mixer transmission 8 is used, which is arranged between electric motor 13 and mixing drum 2.

Figure 4:
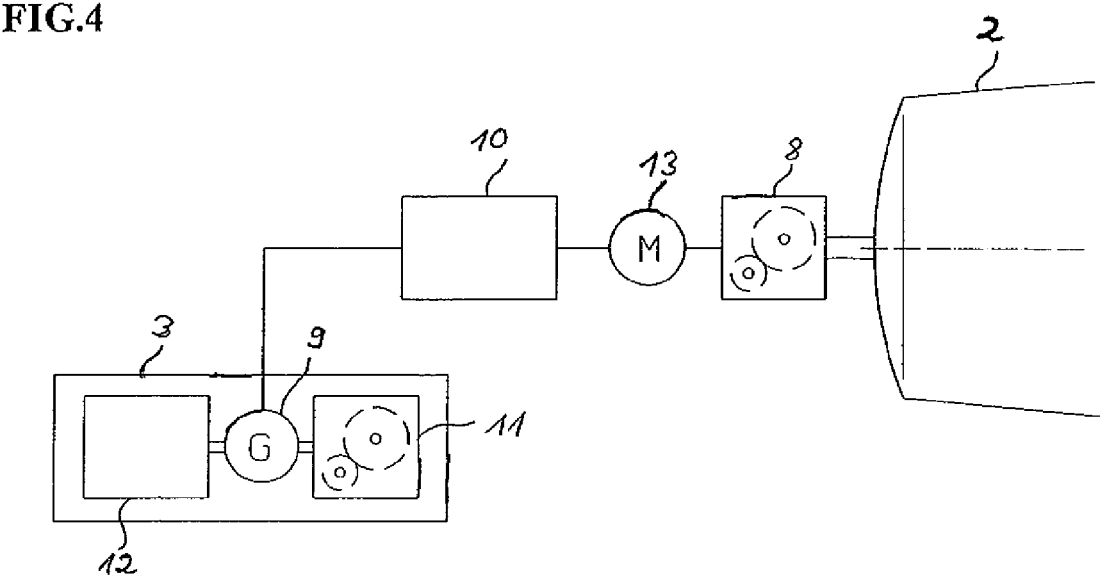
FIG. 4: shows a schematic diagram of a drum drive of the invention, which is coupled to the vehicle drive train.

Another modified variant of the invention can be taken from the representation as shown in FIG. 4. The separate drive 6 of FIG. 3 is omitted here, and the generator 9 instead is coupled to the vehicle drive train 3 of the truck mixer 1. The generator 9 preferably is arranged between the traction motor 12 and the truck transmission 11 of the truck mixer 1. The mechanical shaft of the generator 9 is flange-mounted to an auxiliary drive of the traction motor 12, and thus the mechanical energy of the traction motor 12 is transmitted to the generator 9 and converted into electric energy. Like in the embodiment shown in FIG. 3, the generator 9 likewise is connected with an electric motor 13 via a controller 10, wherein said electric motor in turn is connected with the mixing drum 2 of the truck mixer 1 via a mixer transmission 8 and transmits its output torque to the mixing drum 2. The controller 10 likewise serves to regulate the supply of electric energy from the generator 9 to the electric motor 13.

Optionally, both in the variant as shown in FIG. 3 and in the modified variant of the invention as shown in FIG. 4 the use of a mixer transmission 8 can be omitted.

The invention claimed is:

1. An apparatus for driving a truck mixer (1), comprising, in the following order,
    a mixing drum (2),
    a mixer transmission (8) directly coupled to the a mixing drum (2),
    an electric motor (13) directly coupled to the mixer transmission (8), wherein the mixer transmission (8) is coupled to the mixing drum (2) and electric motor (13) with no other intervening elements therebetween,
    a controller (10) directly coupled to the electric motor (13), wherein the motor (13) is coupled to the transmission (8) and controller (10) therebetween with no other intervening elements therebetween,
    a vehicle drive train (3), and
    a generator (9) directly coupled to the controller (10), forming part of the vehicle drive train (3) and constituting an energy source for operating the electric motor (13), and wherein the controller (10) is coupled to the motor (13) and generator (9) with no other intervening elements therebetween.

2. An apparatus for driving a truck mixer (1) comprising a first vehicle engine and, in the following order,
    a mixing drum (2),
    a mixer transmission (8) directly coupled to the mixing drum (2),
    an electric motor (13) directly coupled to the mixer transmission (8), wherein the mixer transmission (8) is coupled to the mixing drum (2) and electric motor (13) with no other intervening elements therebetween,
    a controller (10) directly coupled to the electric motor (13), wherein the motor (13) is coupled to the transmission (8) and controller (10)) with no other intervening elements therebetween,
    a generator (9) directly coupled to the controller (10) and constituting an energy source for operating the electric motor (13), wherein the controller (10) is coupled to the motor (13) and generator (9)) with no other intervening elements therebetween,
    an articulated shaft (7) directly coupled to the generator (9), wherein the generator (9) is coupled to the controller (10) and articulated shaft (7)) with no other intervening elements therebetween, and
    a second engine (6) coupled to the articulated shaft (7), wherein the articulated shaft (7) is coupled to the generator (9) and second engine (6) with no other intervening elements therebetween.

3. The apparatus for driving a truck mixer (1) according to claim 2, wherein the second engine (6) is a Diesel engine.

4. The apparatus for driving a truck mixer (1) according to claim 2, wherein between the separate engine (6) and the generator (9), an articulated shaft (7) is arranged.

5. The apparatus for driving a truck mixer (1) according to claim 1, wherein the vehicle drive train (3) is arranged to drive the generator (9).

6. The apparatus for driving a truck mixer (1) according to claim 5, additionally comprising
    a vehicle engine (12), and
    a truck transmission (11) of the vehicle drive train (3), and between which the generator (9) is arranged.

7. The apparatus for driving a truck mixer (1) according to claim 1, wherein
    the vehicle drive train (3) comprises a transmission (11) for the mixer (1) and a traction motor (12), and between which the generator (9) is mounted.

8. The apparatus for driving a truck mixer (1) according to claim 6, wherein the vehicle engine (12) is a Diesel engine.

9. The apparatus for driving a truck mixer (1) according to claim 1, wherein the mixer transmission (8), electric motor (13), controller (10) and generator (9) together form a drum drive for the mixing drum (2), without any other intervening elements present in the drum drive.

10. The apparatus for driving a truck mixer (1) according to claim 2, wherein the mixer transmission (8), electric motor (13), controller (10), generator (9) and articulated shaft (7) together form a drum drive for the mixing drum (2), without any other intervening elements present in the drum drive.

* * * * *